United States Patent Office 3,417,027
Patented Dec. 17, 1968

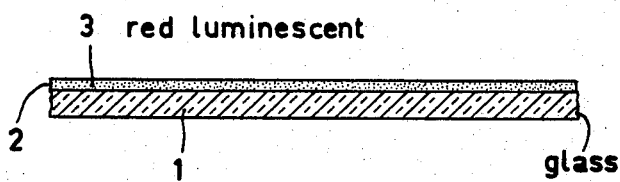

3,417,027
EUROPIUM ACTIVATED YTTRIUM AND GADOLINIUM VANADATE-PHOSPHATE AND VANADATE-ARSENATE PHOSPHORS
Willem Lambertus Wanmaker and Johannus Godefridus Verlijsdonk, Emmasingel, Eindhoven, Netherlands, assignors to North American Philips Company, Inc., New York, N.Y., a corporation of Delaware
Filed Jan. 20, 1966, Ser. No. 521,854
Claims priority, application Netherlands, Feb. 13, 1965, 6501838
3 Claims. (Cl. 252—301.4)

The invention relates to a luminescent screen, for example, for use in cathode-ray tubes or in combination with gas discharge lamps, and to a red luminescent component included in a screen in accordance with the invention.

A great number of publications have recently appeared concerning luminescent substances containing as activator one or more of the rare earth metals. Attempts have particularly been made to obtain luminescent substances exhibiting a red emission. Such substances are of great importance for use in colour television display tubes and for the improvement of the colour rendition of mercury vapour discharge lamps, more particularly high-pressure mercury vapour discharge lamps. During the investigations, particular attention was paid to a high conversion efficiency, a satisfactory temperature dependence and a deep-red colour of the emission. It has been found that these properties can be obtained, often in combination, with different luminescent substances when europium is used as activator. For example, europium-activated gadolinium oxide and europium-activated yttrium vanadate have been described. When excited by electrons or by ultraviolet radiation, these substances exhibit a deep-red emission having a maximum lying between 600 and 625 nm., which is due to the activation with europium. The further properties of the substances are strongly dependent upon the composition of the lattice which contains europium as activator.

A luminescent screen in accordance with the invention contains a red luminescent component according to the formula

$$(Y+Gd)_2O_3 \cdot (1-x)V_2O_5 \cdot x(As+P)_2O_5 : pEu_2O_3$$

in which formula $$0.1 < x < 0.8$$
$$0.02 < p < 0.18.$$

As is apparent from this formula, the red luminescent component consists of europium-activated vanadate of yttrium and/or gadolinium in which part of the vanadium is replaced by arsenic and/or phosphorus. Just like the known europium-activated substances, this component has a deep-red emission having a maximum lying between 600 and 625 nm.

Investigations leading to the invention have shown that the red luminescent component for a screen in accordance with the invention has a satisfactory temperature dependence, that is to say that the efficiency of the conversion of the exciting radiation into the red radiation at temperatures between 300° C. and 600° C. does not excessively deviate from the conversion efficiency at room temperature. This property is of particular importance when the screen in accordance with the invention is used in combination with a high-pressure mercury vapour discharge tube in order to reduce the lack of red radiation of such a source of radiation. For in this case, the luminescent screen is generally disposed at a short distance from the discharge tube and becomes hot as a result of the emission of heat of the discharge tube. Also in cathode-ray tubes, however, this property is of importance, since in this case a high screen load is admissible, for example, when the cathode-ray tubes are used for projection television purposes.

The red luminescent component of a screen in accordance with the invention, when used in television display tubes, further has the great advantage that the body-colour of the component is white. This is of particular importance in case of use in colour television display tubes. Hitherto use has mostly been made of a silver-activated zinc cadmium sulphide. This sulphide has a light-yellow body-colour. If the colour image is considered in a not completely dark room, for example, at daylight, the colour of the image observed is not only determined by the luminescent light produced, but also by the reflected incident light. If the substance emitting red light has a light-yellow colour, due to the incident light a shift towards orange takes place which can readily be observed by the eye. If the substance is white, as is the case with the red luminescent component in a screen in accordance with the invention, a colour shift cannot take place. The colour only becomes slightly less saturated, which is less disturbing than a colour shift.

As stated above, it has already been suggested to use as red luminescent component europium-activated yttrium vanadate. In comparison with this substance, the substances in accordance with the invention have the advantage that in the first place they have a considerably more satisfactory temperature dependence, that in the second place the emission is slightly more monochromatically red and that in the third place the preparation is considerably simpler.

In comparison with the pure phosphates of yttrium and gadolinium, the mixed compounds in accordance with the invention have the advantage of a higher light output and a more satisfactory temperature dependence.

Moreover, the vanadates in which according to the invention part of the vanadium has been replaced by phosphorus and/or arsenic have a lower saturation than the non-substituted vanadates when struck by electrons.

The temperature dependence will be explained hereinafter with reference to examples. With respect to the more monochromatic red emission, it should be noted that this phenomenon is due to the fact that the phosphorus- and/or arsenic-containing vanadates just like the vanadates and phosphates themselves have the same strong emission lines at wave lengths of 615 and 619 nm., it is true, but that in the mixed compounds the line at 619 nm. is relatively stronger than the line at 615 nm.

The preparation of the mixed compounds is simpler than that of the vanadates of corresponding composition. The vanadates are generally prepared from the oxides of yttrium, gadolinium, vanadium and europium or from compounds which produce these oxides when they are heated, for example, ammonium vanadate, yttrium oxalate or gadolinium nitrate. The reaction at which the luminescent vanadates are produced is found to have an unsatisfactory progress, that is to say that the output is low. An improvement can be obtained in known manner in that one of the two starting substances is used in excess. This has disadvantages, however. If an excess of yttrium- or gadolinium oxide is used, beside the desired vanadate there is also produced europium-activated yttrium- or gadolinium oxide. The intensity of the emission at shorter wave lengths, i.e. at approximately 611 nm., is greater for these oxides than for the corresponding vanadates. If an excess of ammonium vanadate or of vanadium oxide is used, part of the vanadium oxide sometimes remains in the final product. As a result, the final product is yellow-coloured which again may give rise to the aforementioned colour shift due to incident light. The use of vanadium oxide itself moreover involves the risk that it is readily dissociated into strongly coloured oxides of lower valency, for example, black $VO_2$. In the preparation of the mixed compounds in accordance with the invention, these disadvantages are avoided.

The preparation of the compounds in accordance with the invention is comparatively simple. The preferred starting substances are the oxides of yttrium and/or gadolinium which are mixed in the desired quantities with the required quantity of ammonium vanadate ($NH_4VO_3$), diammonium hydrophosphate (($NH_4$)$_2HPO_4$) and/or arsenic pentoxide ($As_2O_5$) and with the required quantity of europium oxide ($Eu_2O_3$). For a few hours, the mixture is heated in quartz crucibles in an oxidizing atmosphere, for example, in air. This heating must generally be carried out between 700° C. and 1,400° C. In certain cases, it is desirable to carry out the heating in steps, that is to say that first a heat treatment is carried out for a few hours at lower temperature, the reaction product obtained is then ground and mixed, whereupon the fine mixture thus obtained is again heated for a few hours at a higher temperature. This process may be repeated, if desired, for a few times. The table below provides a survey of the preparation of four compounds.

TABLE I

| Mixtures in gms. | | | | | Three firings for two hours each respectively at— |
|---|---|---|---|---|---|
| $Y_2O_3$ | $Gd_2O_3$ | $NH_4VO_3$ | $(NH_4)_2HPO_4$ | $Eu_2O_3$ | |
| 3.94 | ---- | 1.69 | 2.86 | 0.38 | 700°+1,150°+1,150°. |
| ---- | 3.45 | 0.92 | 1.55 | 0.21 | Idem. |
| 4.07 | ---- | 2.11 | 2.38 | 0.19 | Do. |
| 3.70 | ---- | 2.11 | 2.38 | 0.76 | Do. |

In the preparation, the aforementioned quantities of the compounds are used in the starting mixture. The molar ratios which can be calculated from these quantities by weight slightly deviate from the molar composition stated above. This technique is usual in the preparation of luminescent substances in order to obtain a smooth progress of the reaction.

The following Table II indicates the compositions in a great number of compounds calculated from the quantities by weight of the mixed starting substances. All substances have been heated in the same manner, that is to say three times in succession for two hours at 700° C., 1150° C. and 1150° C., respectively.

value $x$ lies between 0.2 and 0.6 and at an europium trioxide content (designated by $p$) lying between 0.05 and 0.10.

In the table, the substances provided with the numerals 1–12 are in accordance with the invention. The substances designated by $a$, $b$, $c$ and $d$ relate to the pure vanadates and phosphates. These compounds are included in the table for comparison of the relative light outputs with those of the compounds in accordance with the invention.

With regard to the ratio between yttrium and gadolinium and the ratio between phosphorus pentoxide and arsenic pentoxide, it should be noted that the influence thereof on the properties of the luminescent substances is negligible. Consequently, if desired, combinations of these oxides may be used.

The invention will now be illustrated with reference to the accompanying drawing.

In the drawing 1 is a base, consisting e.g. of glass, to which is applied a layer 2 containing a red luminescent material 3 according to the invention.

What is claimed is:

1. A red luminescent substance particularly suitable for use in a luminescent screen, said luminescent component being a europium activated vanadate phosphor of the formula:

$$(Y+Gd)_2O_3 \cdot (1-X)V_2O_5 \cdot x(As+P)_2O_5 : pEu_2O_3$$

wherein $$0.1 < x < 0.8$$
$$0.02 < p < 0.18$$

2. The luminescent substance of claim 1 wherein $$0.2 < x < 0.6$$
$$0.05 < p < 0.10$$

3. A luminescent screen containing as a red luminescent component the red luminescent substance of claim 1.

TABLE II

| No. | Molar composition | | | | | | Relative L.O. | | |
|---|---|---|---|---|---|---|---|---|---|
| | $Y_2O_3$ | $Gd_2O_3$ | $V_2O_5$ | $P_2O_5$ | $As_2O_5$ | $Eu_2O_3$ | A room temperature | At 350° C. in percent of L.O. room/temp. | At 500° C. in percent of L.O. room/temp. |
| 1 | 0.97 | ---- | 0.2 | 0.8 | ---- | 0.06 | 110 | 87 | 71 |
| 2 | 0.97 | ---- | 0.4 | 0.6 | ---- | 0.06 | 123 | 104 | 85 |
| 3 | 0.97 | ---- | 0.6 | 0.4 | ---- | 0.06 | 122 | 100 | 64 |
| 4 | 0.97 | ---- | 0.8 | 0.2 | ---- | 0.06 | 122 | 100 | 61 |
| 5 | ---- | 0.97 | 0.2 | 0.8 | ---- | 0.06 | 85 | 80 | 60 |
| 6 | ---- | 0.97 | 0.4 | 0.6 | ---- | 0.06 | 124 | 104 | 84 |
| 7 | ---- | 0.97 | 9.6 | 9.4 | ---- | 0.06 | 127 | 89 | 70 |
| 8 | ---- | 0.97 | 0.8 | 0.2 | ---- | 0.06 | 130 | 95 | 41 |
| 9 | 1.0 | ---- | 0.5 | 0.5 | ---- | 0.03 | 137 | 100 | 93 |
| 10 | 0.91 | ---- | 0.5 | 0.5 | ---- | 0.12 | 123 | 103 | 92 |
| 11 | 0.94 | ---- | 0.5 | ---- | 0.5 | 0.06 | 131 | 86 | 50 |
| 12 | ---- | 0.94 | 0.5 | ---- | 0.5 | 0.06 | 123 | 82 | 45 |
| a | 0.97 | ---- | ---- | 1.0 | ---- | 0.06 | 69 | 88 | 67 |
| b | 0.97 | ---- | 1.0 | ---- | ---- | 0.06 | 123 | 80 | 86 |
| c | ---- | 0.97 | ---- | 1.0 | ---- | 0.06 | 28 | 59 | 39 |
| d | ---- | 0.97 | 1.0 | ---- | ---- | 0.06 | 129 | 94 | 33 |

The relative light output (L.O.) in Table II has been measured under excitation by radiation of 253.7 nm. wave length with respect to a standard luminescent powder. This standard powder consisted of a mixture of white luminescent antimony- and manganese-activated calcium halophosphate with a quantity of calcium carbonate such that the light output of the calcium halophosphate was reduced to 52.5%.

As is apparent from Table II, the optimum temperature dependence is obtained in those compounds in which the

References Cited

UNITED STATES PATENTS 3,152,085 10/1964 Ballman et al. ----- 252—301.4
3,250,722 5/1966 Borchardt -------- 252—301.4

TOBIAS E. LEVOW, *Primary Examiner.*

ROBERT D. EDMONDS, *Assistant Examiner.*

U.S. Cl. X.R.

313—109, 92

UNITED STATES PATENT OFFICE
CERTIFICATE OF CORRECTION

Patent No. 3,417,027                                    December 17, 1968

Willem Lambertus Wanmaker et al.

It is certified that error appears in the above identified patent and that said Letters Patent are hereby corrected as shown below:

Columns 3 and 4, TABLE II, fourth column, line 7 thereof, "9.6" should read -- 0.6 --; fifth column, line 7 thereof, "9.4" should read -- 0.4 --; last column, line 14 thereof, "86" should read -- 16 --.

Signed and sealed this 11th day of August 1970.

(SEAL)
Attest:

Edward M. Fletcher, Jr.                              WILLIAM E. SCHUYLER, JR.
Attesting Officer                                                Commissioner of Patents